United States Patent
Kohli

(10) Patent No.: US 10,091,007 B2
(45) Date of Patent: Oct. 2, 2018

(54) SYSTEMS AND METHODS FOR DEVICE TO DEVICE AUTHENTICATION

(71) Applicant: MasterCard International Incorporated, Purchase, NY (US)

(72) Inventor: Manoneet Kohli, O'Fallon, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 124 days.

(21) Appl. No.: 15/090,331

(22) Filed: Apr. 4, 2016

(65) Prior Publication Data
US 2017/0288884 A1 Oct. 5, 2017

(51) Int. Cl.
| | |
|---|---|
| G06F 21/30 | (2013.01) |
| H04L 9/32 | (2006.01) |
| H04L 29/06 | (2006.01) |
| G06F 21/34 | (2013.01) |
| G06Q 20/38 | (2012.01) |

(52) U.S. Cl.
CPC ............ *H04L 9/3271* (2013.01); *G06F 21/34* (2013.01); *G06Q 20/382* (2013.01); *H04L 63/0853* (2013.01); *H04L 63/0876* (2013.01); H04L 2209/56 (2013.01)

(58) Field of Classification Search
CPC ......... G06F 21/30; G06F 21/44; H04L 9/3271
USPC ........... 713/180–182; 726/5–7; 280/255–258
See application file for complete search history.

(56) References Cited

U.S. PATENT DOCUMENTS

| | | | |
|---|---|---|---|
| 8,625,796 B1 * | 1/2014 | Ben Ayed | H04L 63/0853 380/258 |
| 9,941,926 B2 * | 4/2018 | Danev | H04B 1/7183 |
| 2003/0065918 A1 * | 4/2003 | Willey | H04L 63/0492 713/168 |

(Continued)

FOREIGN PATENT DOCUMENTS

| | | |
|---|---|---|
| KR | 100974028 B1 | 8/2010 |
| WO | 2009073900 A2 | 6/2009 |
| WO | 2014174506 A1 | 10/2014 |

OTHER PUBLICATIONS

PCT Search Report and Written Opinion, Application No. PCT/US2017/024417, dated Jun. 30, 2017, 11 pps.

*Primary Examiner* — Morshed Mehedi
*Assistant Examiner* — Viral S Lakhia
(74) *Attorney, Agent, or Firm* — Armstrong Teasdale LLP

(57) ABSTRACT

A method for authenticating a user device by an authentication computing device is provided. The method includes generating, using the authentication computing device, a locked data file for use in authenticating a user device enrolled in an authentication service, the locked data file is configured to process a challenge and generate a challenge response. The method further includes transmitting the locked data file from the authentication computing device to a first user device as part of the first device enrolling in the authentication service, receiving, at the authentication computing device, an authentication request, generating, using the authentication computing device, the challenge based on the authentication request, transmitting the challenge from the authentication computing device to the first user device, and receiving, at the authentication computing device, the challenge response from the first user device to authenticate the first user device.

11 Claims, 6 Drawing Sheets

(56) References Cited

U.S. PATENT DOCUMENTS

| | | |
|---|---|---|
| 2003/0115142 A1 | 6/2003 | Brickell et al. |
| 2008/0195499 A1 | 8/2008 | Meredith et al. |
| 2008/0223918 A1 | 9/2008 | Williams et al. |
| 2010/0145861 A1 | 6/2010 | Law et al. |
| 2010/0146261 A1* | 6/2010 | Talstra ............... G06F 21/10 713/155 |
| 2010/0293094 A1 | 11/2010 | Kolkowitz et al. |
| 2011/0145899 A1 | 6/2011 | Cao et al. |
| 2012/0213368 A1* | 8/2012 | Falk ............... G06F 21/31 380/270 |
| 2012/0271764 A1 | 10/2012 | Chen |
| 2012/0278241 A1 | 11/2012 | Brown et al. |
| 2013/0030941 A1 | 1/2013 | Meredith et al. |
| 2013/0133086 A1* | 5/2013 | Liberman ............... G09C 5/00 726/28 |
| 2013/0151358 A1 | 6/2013 | Ramalingam |
| 2013/0151419 A1 | 6/2013 | Hitchcock et al. |
| 2013/0298208 A1* | 11/2013 | Ayed ............... G06F 21/00 726/6 |
| 2014/0040628 A1* | 2/2014 | Fort ............... G06F 21/34 713/182 |
| 2014/0172710 A1 | 6/2014 | Brody et al. |
| 2015/0032621 A1 | 1/2015 | Kar et al. |
| 2015/0106216 A1 | 4/2015 | Kenderov |
| 2015/0312233 A1* | 10/2015 | Graham, III ............ H04L 9/006 713/171 |
| 2016/0019547 A1 | 1/2016 | Gurnani et al. |
| 2016/0180072 A1* | 6/2016 | Ligatti ............... G06F 21/34 726/7 |
| 2016/0182500 A1* | 6/2016 | Ligatti ............... H04L 63/0853 713/156 |
| 2017/0013451 A1* | 1/2017 | Miao ............... H04W 8/18 |

\* cited by examiner

SYSTEMS AND METHODS FOR DEVICE TO DEVICE AUTHENTICATION

FIELD OF THE DISCLOSURE

The field of the invention relates generally to device to device authentication, and more particularly, to a network-based system and method for authenticating a user device by receiving a challenge at the user device from an authentication computing device and automatically responding to the challenge using a locked data file stored on the user device.

BACKGROUND OF THE DISCLOSURE

In today's world, computing devices communicate with other computing devices through networks. During such communications, it may be difficult to verify, or authenticate, that a remote computing device is actually the computing device that it purports to be. For example, online businesses or merchants that offer sales online face unique challenges because such purchases are made through a "card not present" transaction, in which a merchant is unable able to inspect the payment card being used in the purchase. Further, such purchases are made without the merchant or consumer physically swiping the payment card, or inserting a payment card including a chip into a terminal. Today, most card not present fraud take place with computing devices communicating with one another over the Internet.

In a card not present transaction, the merchant releases the items purchased with an understanding that the actual cardholder authorized the purchase and that the actual cardholder will make the necessary payment. In this case, because the cardholder is not present, the items purchased are often delivered to an address selected by the cardholder at the time of the transaction. Due to the anonymity of a purchaser during an online transaction, fraud often occurs. That is, unauthorized users may purchase items online using a victim's account information. In some cases, a thief only needs the card number itself to make an online purchase. However, because the payment card information input by the thief is drawn to a valid account, a merchant is typically unaware of the fraud until after the fact.

In an attempt to increase security, online merchants may request additional information about the payment card (e.g., CSC, CVC, CVV) or additional information from the cardholder such as an address, phone number, email, answers to previously asked security questions, and the like. However, card information and personal information about a cardholder are also susceptible to being obtained by a thief. For example, criminals may infiltrate legitimate corporations and use their employment as a means for accessing customer and credit card information, and subsequently use this information to commit fraud. This type of fraud, referred to as skimming, usually occurs when the credit card information is obtained by a dishonest employee or agent of a legitimate merchant. Skimming often takes place in restaurants and bars where the skimmer has possession of the victim's credit card outside of their view.

Phishing is another criminal activity whereby fraudsters attempt to acquire sensitive information, such as credit card numbers, addresses, social security numbers, drivers' license numbers, usernames, and passwords by appearing as a trustworthy organization in an electronic communication. Phishing is typically carried out by email or instant messaging, and often directs users to provide the sensitive information on a website monitored by the criminals, although phone contact may also be used.

Spyware or malware may also be used by criminals to obtain payment card information about a cardholder. Spyware is often attached to trusted data downloaded by a person, such as emails, files, and the like. Spyware covertly gathers cardholder information without the cardholder's knowledge. Typically, the software monitors a user's activity online while remaining in the background and transmits information about the user's activity to another device controlled by the thief. Any kind of data a user enters online including an email address, username, password, credit card number, and the like, may be gathered and used by a third party criminal.

Therefore, an authentication system is needed which is capable of verifying that a user computing device is, in fact, a user computing device of an authorized user.

BRIEF DESCRIPTION OF THE DISCLOSURE

In one aspect, a method for authenticating a user device by an authentication computing device is provided. The method includes generating, using the authentication computing device, a locked data file for use in authenticating a user device enrolled in an authentication service, the locked data file is configured to process a challenge and generate a challenge response. The method further includes transmitting the locked data file from the authentication computing device to a first user device as part of the first device enrolling in the authentication service, receiving, at the authentication computing device, an authentication request, generating, using the authentication computing device, the challenge based on the authentication request, transmitting the challenge from the authentication computing device to the first user device, and receiving, at the authentication computing device, the challenge response from the first user device to authenticate the first user device.

In another aspect, an authentication computing device for authenticating a user device is provided. The authentication computing device includes one or more processors in communication with one or more memory devices. The authentication computing device is configured to generate a locked data file for use in authenticating a user device enrolled in an authentication service, the locked data file is configured to process a challenge and generate a challenge response. The authentication computing device is further configured to transmit the locked data file to a first user device as part of the first user device enrolling in the authentication service, receive an authentication request, generate the challenge based on the authentication request, transmit the challenge from the authentication computing device to the first user device, and receive the challenge response from the first user device to authenticate the first user device.

In yet another aspect, a computer-readable storage medium having computer-executable instructions embodied thereon is provided. When executed by an authentication computing device having one or more processors in communication with one or more memory devices, the computer-executable instructions cause the authentication computing device to generate a locked data file for use in authenticating a user device enrolled in an authentication service, wherein the locked data file is configured to process a challenge and generate a challenge response, transmit the locked data file to a first user device as part of the first user device enrolling in the authentication service, receive an authentication request, generate the challenge based on the authentication request, transmit the challenge from the authentication computing device to the first user device, and receive the challenge response from the first user device to authenticate the first user device.

BRIEF DESCRIPTION OF THE DRAWINGS

FIG. 1 is a schematic diagram illustrating an example multi-party payment card industry system for enabling device to device authentication in online payment card transactions.

FIG. 2 is a diagram of an example embodiment of a device to device authentication system in accordance with one example embodiment of the present disclosure.

FIG. 3 illustrates an example configuration of a computing device in accordance with one example embodiment of the present disclosure.

FIG. 4 is a flowchart of an example method for authenticating a user device, performed by an authentication computing device, in accordance with one example embodiment of the present disclosure.

FIG. 5 is a diagram of components of one or more example computing devices that may be used in embodiments of the described systems and methods.

FIG. 6 is a flowchart of an example authentication enrollment process in accordance with one example embodiment of the present disclosure.

DETAILED DESCRIPTION OF THE DISCLOSURE

Figure 1:
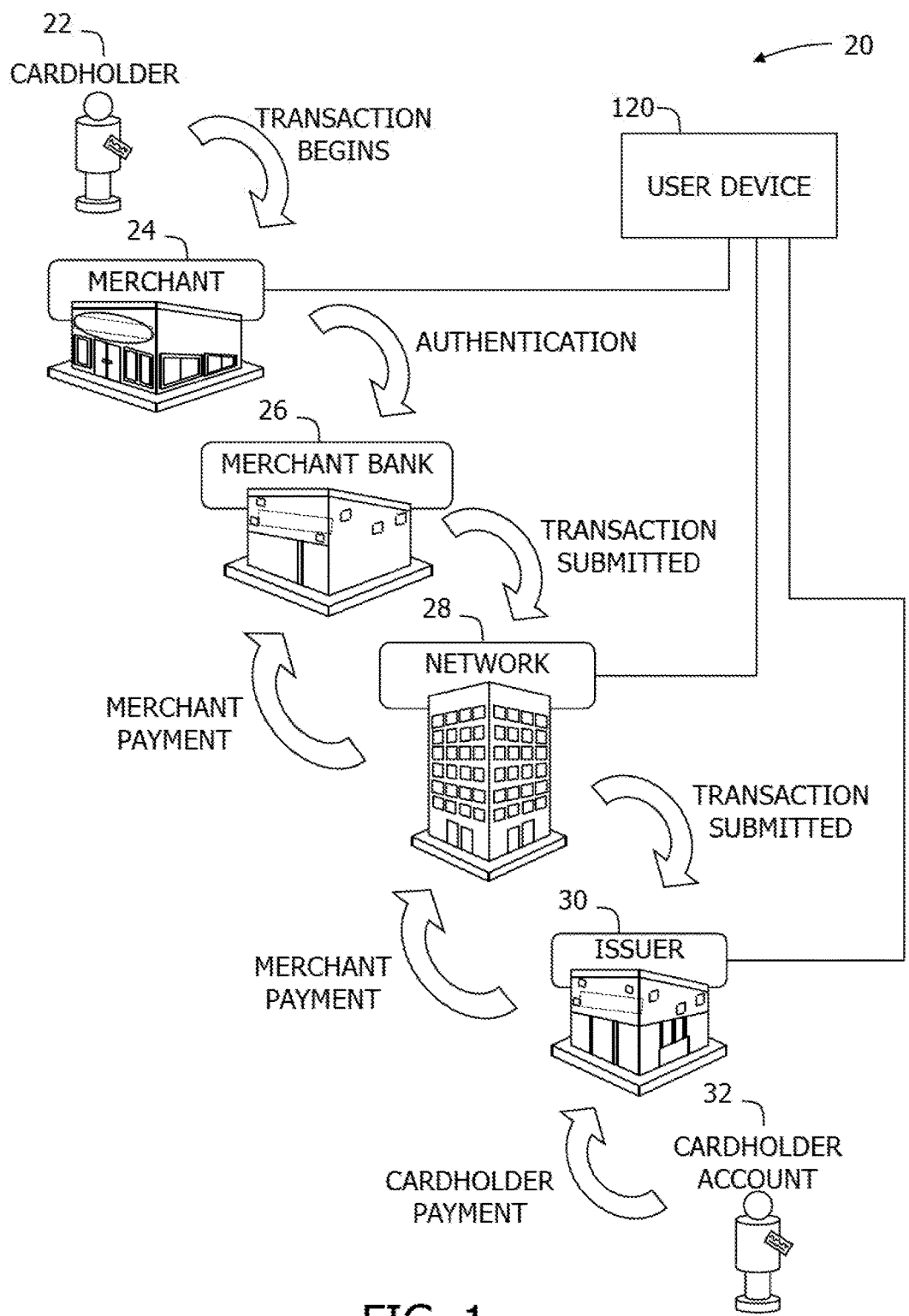
FIGS. 1-6 show example embodiments of the methods and systems described herein.

The disclosure relates generally to device to device authentication, and more particularly, to a network-based system and method for authenticating a user device by receiving a challenge at the user device from an authentication device and automatically responding to the challenge using a locked data file stored on the user device.

The disclosure provides systems and methods for performing device to device authentication. As used here, authentication refers to verifying that a user device is, in fact, a user computing device of an authorized user. For example, authentication methods may be useful in identifying whether a particular transaction is fraudulent or not. Using device to device authentication, as described herein, facilitates automatically verifying a user device (e.g., for an online transaction), improving security. Accordingly, methods and systems, such as those provided herein, of authenticating a user device are desirable.

The methods and systems described herein may be implemented using computer programming or engineering techniques including computer software, firmware, hardware or any combination or subset thereof, to perform at least one of the following steps: (a) generating, using an authentication computing device, a locked data file as part of an authentication enrollment process, wherein the locked data file is configured to process a challenge and generate a challenge response; (b) transmitting the locked data file from the authentication computing device to a user device; (c) receiving, at the authentication computing device, an authentication request; (d) generating, using the authentication computing device, the challenge based on the authentication request; (e) transmitting the challenge from the authentication computing device to the user device; and (f) receiving, at the authentication computing device, the challenge response from the user device to authenticate the user device.

Accordingly, the systems and methods described herein perform device to device authentication a user device. By performing these steps, the systems and methods solve problems in computer networking of device authentication that would otherwise be unattainable. More specifically, by receiving and responding to a challenge using a locked data file on a user device, a problem necessarily rooted in computer networking (i.e., authenticating a user device for an online transaction) is solved using computer networking tools.

As described herein, in one example, a user (e.g., a cardholder) may register for device authentication through a bank which issued a payment card to the cardholder. During the registration process, the cardholder may provide the issuing bank with cardholder information and device information for enrolling a user device. As part of the device enrollment, an authenticator application (e.g., a locked data file) is pushed to the user device.

Subsequently, the cardholder may attempt to make a purchase from an online merchant using the enrolled user device. During checkout, the cardholder may be asked to input his/her payment card or account information. Accordingly, the cardholder may enter payment account information for the account associated with the authentication. The online merchant may forward initial transaction information to a payment processor for processing. In response, the payment processor may determine that the payment account is enrolled in the device authentication service. Based on cardholder information acquired during the enrollment process, the payment processor may issue, or may cause a device authentication server to issue, a challenge message to the user device of the cardholder.

The locked data file on the user device will receive the challenge message so long as the cardholder's user profile is currently active on the user device. For example, in some embodiments, the locked data file is a background process that runs whenever a cardholder's user profile is currently active, and, while running, is prepared to receive and process the challenge message. In other embodiments, an authenticator application separate from the locked data file receives the challenge request, and calls the locked data file to process the challenge message so long as the cardholder's user profile is currently active on the user device. The locked data file may automatically decrypt the challenge message, generate a challenge response, encrypt the challenge response, and transmit the challenge response to the payment processor and/or device authentication server. Upon receipt of the challenge response, the payment processor and/or device authentication server completes authentication of the user device and cardholder, and proceeds with processing the transaction.

The methods and systems described herein may be implemented using computer programming or engineering techniques including computer software, firmware, hardware or any combination or subset thereof, wherein the technical effects may be achieved by performing one of the following steps: (a) generating, using an authentication computing device, a locked data file as part of an authentication enrollment process, wherein the locked data file is configured to process a challenge and generate a challenge response; (b) transmitting the locked data file from the authentication computing device to a user device; (c) receiving, at the authentication computing device, an authentication request; (d) generating, using the authentication computing device, the challenge based on the authentication request; (e) transmitting the challenge from the authentication computing device to the user device; and (f) receiving, at the authentication computing device, the challenge response from the user device to authenticate the user device.

Described herein are computer systems such as an authentication computing device, a user device, an authentication device, a merchant device, a payment processor, an issuer device, and related systems. As described herein, all such computer systems include a processor and a memory.

Further, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. For example, the operating system may include any operating system capable of supporting device authentication, as described herein, including, but not limited to, iOS, Android, Symbian, etc. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

The following detailed description illustrates embodiments of the disclosure by way of example and not by way of limitation. It is contemplated that the disclosure has general application to authenticating a cardholder for an online payment card transaction.

FIG. 1 is a schematic diagram illustrating an example multi-party payment card system 20 for enabling device to device authentication in online payment card transactions. The present disclosure relates to payment card system 20, such as a credit card payment system using the MasterCard® payment card system payment network 28 (also referred to as an "interchange" or "interchange network"). MasterCard® payment card system payment network 28 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 20, a financial institution such as an issuer 30 issues a payment card for an account, such as a credit card account or a debit card account, to a cardholder 22, who uses the payment card to tender payment for a purchase from a merchant 24. To accept payment with the payment card, merchant 24 must normally establish an account with a financial institution that is part of the financial payment system. This financial institution is usually called the "merchant bank" or the "acquiring bank" or "acquirer bank" or simply "acquirer". When a cardholder 22 tenders payment for a purchase with a payment card (also known as a financial transaction card), merchant 24 requests authorization from acquirer 26 for the amount of the purchase. Such a request is referred to herein as an authorization request message. The request may be performed over the telephone, but is usually performed through the use of a point-of-interaction terminal, also referred to herein as a point-of-sale device, which reads the cardholder's account information from the magnetic stripe on the payment card and communicates electronically with the transaction processing computers of acquirer 26. Alternatively, acquirer 26 may authorize a third party to perform transaction processing on its behalf. In this case, the point-of-interaction terminal will be configured to communicate with the third party. Such a third party is usually called a "merchant processor" or an "acquiring processor."

Using payment card system payment network 28, the computers of acquirer 26 or the merchant processor will communicate with the computers of issuer 30, to determine whether the cardholder's account 32 is in good standing and whether the purchase is covered by the cardholder's available credit line or account balance. Based on these determinations, the request for authorization will be declined or accepted. If the request is accepted, an authorization code is issued to merchant 24.

When a request for authorization is accepted, the available credit line or available balance of cardholder's account 32 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 24 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, cardholder's account 32 is decreased. Normally, a charge is posted immediately to cardholder's account 32. The bankcard association then transmits the approval to the acquiring processor for distribution of goods/services, or information or cash in the case of an ATM.

After a transaction is captured, the transaction is settled between merchant 24, acquirer 26, and issuer 30. Settlement refers to the transfer of financial data or funds between the merchant's account, acquirer 26, and issuer 30 related to the transaction. Usually, transactions are captured and accumulated into a "batch," which is settled as a group.

For online transactions, an authentication process may also be performed to verify that cardholder 22 is physically present when making an online purchase with cardholder's account 32. In the embodiments described herein, a user device 120 operated by cardholder 22 facilitates performing a device to device authentication process for online transactions processed using payment card system 20. To facilitate authentication, user device 120 is in communication with merchant 24, payment network 28, and issuer 30, as described herein.

Figure 2:
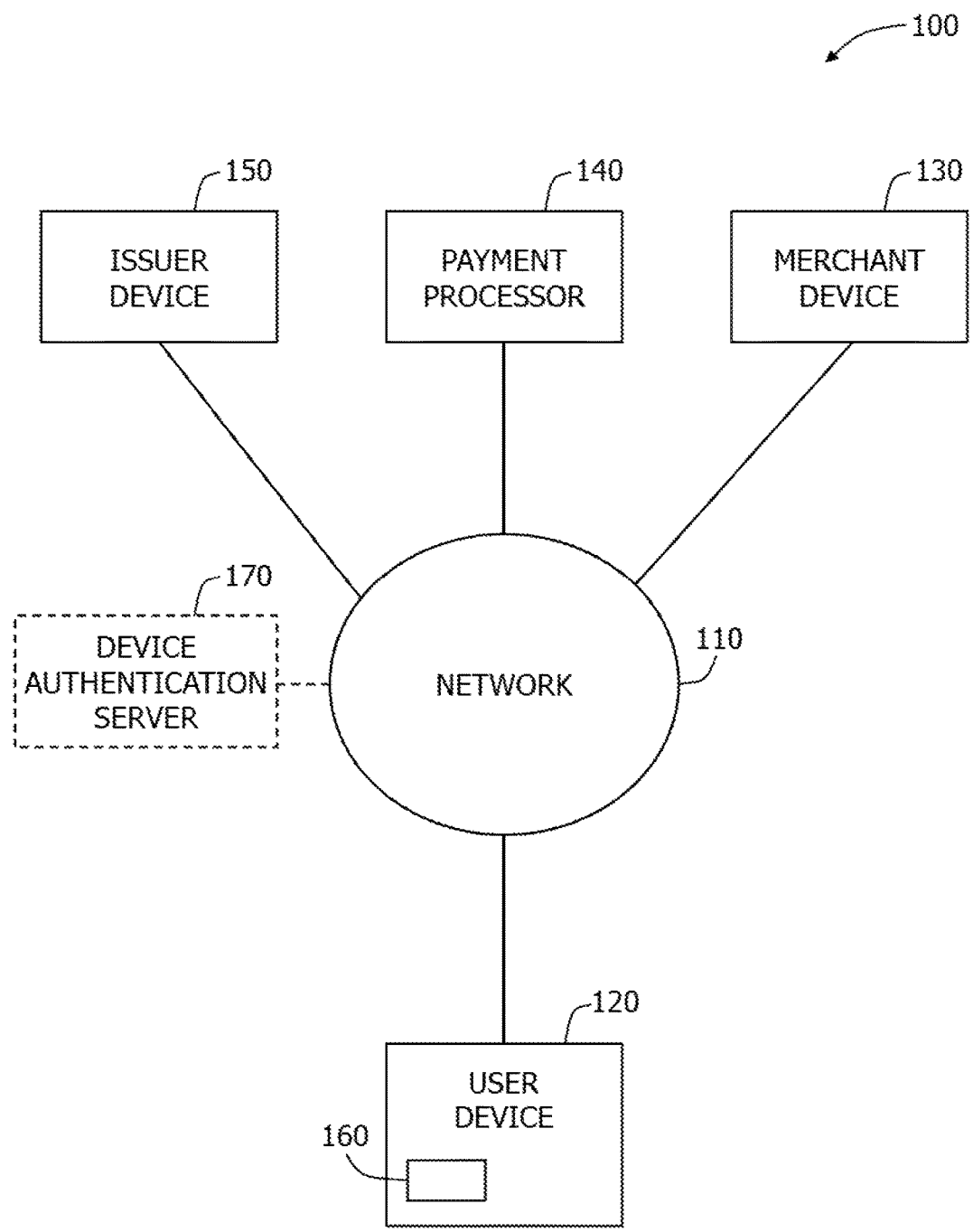

FIG. 2 is a diagram illustrating an example of a device to device authentication system 100 that may be used, for example, in payment card system 20 (shown in FIG. 1). Authentication system 100 includes a plurality of computing devices that are connected to each other via a network 110. Network 110 may include the Internet, a local network, a home network, a combination of networks, and the like. The computing devices include user device 120, a merchant device 130 operated by a merchant, such as merchant 24 (shown in FIG. 1), a payment processor 140, and an issuer device 150 operated by an issuing bank, such as issuer 30 (shown in FIG. 1).

In this example, user device 120 refers to a computing device of a cardholder, for example, a smartphone, a tablet, a phablet, a notebook, a smartwatch, and the like. A cardholder, such as cardholder 22 (shown in FIG. 1) may access merchant device 130, or an online web site of the merchant, and purchase an item from the merchant using a payment card account, such as cardholder account 32 (shown in FIG. 1). For example, the cardholder may use user device 120 in order to make the online purchase. The purchase may be referred to as a card not present (CNP) purchase because the transaction is not performed face-to-face but is instead performed online through network 110. In other words, the merchant is not able to physically inspect a payment card of the cardholder nor is the payment card capable of being swiped through or inserted into a point of sale device of the merchant.

Merchant device 130, payment processor 140, and issuer device 150 are also connected to network 110. In this example, the issuing bank refers to a bank that issued a payment card to the cardholder. At the time of issuing the payment card, or at a later time, the cardholder may register the payment card account for an authentication service. For example, the payment card account may be registered for authentication through at least one of issuer device 150, payment processor 140, and merchant device 130. The payment card account may be registered, for example, for authentication through the issuer. During an enrollment process, cardholder information (e.g., biometric information) and device information (e.g., a device ID) of user device 120 are provided.

Once user device 120 is enrolled, an authentication computing device, such as a device authentication server 170, pushes an authenticator application to user device 120 and the authenticator application is installed on user device 120. Device authentication server 170 may be part of payment processor 140, issuer device 150, and/or merchant device 130, or may be a separate computing device in communication with payment processor 140.

In the example embodiment, the authenticator application is a locked data file 160. Notably, locked data file 160 is linked to the cardholder's user profile on user device 120, and is only activated when the cardholder's user profile is active. Accordingly, if another user profile (e.g., a profile for a family member of the cardholder) is currently active on the user device 120, locked data file 160 is inactive. Locked data file 160 may be for example, an .exe file, an .apk file, or a .bat file. Alternatively, locked data file 160 may have any format that enables locked data file 160 to function as described herein. In the example embodiment, locked data file 160 runs as a background process whenever the cardholder's user profile is active. When the background process is running, locked data file 160 may be referred to as "open" (i.e., able to receive and process a challenge message). When the cardholder's user profile is not active, the background process does not run, and locked data file 160 is unable to receive and process a challenge message. In alternative embodiments, locked data file 160 is called by a separate authenticator application to process a challenge message received at the authenticator application. The authenticator application is only able to successfully call locked data file 160 if the cardholder's user profile is active.

In the example embodiment, locked data file 160 is installed on user device 120 at the time of enrollment, as described herein. At the time of enrollment, locked data file 160 is bound to a user profile of the user performing the enrollment. Accordingly, locked data file 160 is protected and only accessible or active to support device authentication when the user profile to which locked data file 160 is bound is active. If user device 120 is a shared device (i.e., used by multiple users), device authentication will only be supported when the user who enrolled is using the device. If another user is operating user device 120 under a different user profile, user device 120 will not process a received challenge and generate a challenge response, as described herein. In some embodiments, for a shared device, different users may each have their own locked data file 160 stored on user device 120 and bound to their respective user profiles.

When the cardholder makes an online purchase using the registered account, authentication system 100 may perform a device to device authentication using device authentication server 170 and user device 120. For example, the cardholder may use user device 120 to make an online purchase for an item sold by the merchant. Here, because the transaction occurs online or over the phone, the transaction is referred to as a CNP transaction. Using user device 120, the cardholder may authorize payment of the item using the payment card registered for authentication.

At this point, during the authorization of the transaction, one or more of merchant device 130, payment processor 140, and issuer device 150 may detect that the account of the cardholder is enrolled in the authentication service, and may issue a challenge to user device 120 for authentication. As a non-limiting example, merchant device 130 may receive the cardholder's information and transmit transaction information to payment processor 140 through network 110 to authorize the transaction. The transaction information may include an identification of the cardholder, an account number, a purchase price, a time and day, and the like.

In response to receiving the authorization request from merchant device 130, payment processor 140 may detect that cardholder is enrolled for the authentication service. Accordingly, the payment processor 140 may initiate an authentication process of the cardholder.

For example, payment processor 140 may transmit an authentication request to device authentication server 170, causing device authentication server 170 to transmit a challenge to user device 120. Device authentication server 170 stores, for example, records of user device 120 and records of locked data file 160. Device authentication server 170 generates the challenge based on the stored records.

User device 120 receives the challenge from device authentication server. If the user profile of the cardholder is active, locked data file 160 installed as part of the device enrollment is activated, and receives the challenge. Otherwise, locked data file 160 does not receive the challenge, preventing the cardholder from being authenticated. In the example embodiment, the challenge is an encrypted message, and locked data file 160 is able to decrypt the encrypted message. To authenticate user device 120, locked data file 160 processes the challenge, generates a challenge response, and causes the challenge response to be transmitted from user device 120 to the device authentication server.

Locked data file 160, in the example embodiment, uses one or more encryption keys to encrypt and decrypt messages sent to and from device authentication server 170. For example, locked data file 160 may encrypt the challenge response before transmission. In the example embodiment, locked data file 160 includes two layers of encryption. A first layer of encryption enables locked data file 160 to securely communicate with device authentication server 170. A second layer of encryption ensures locked data file 160 is only activated when the user profile associated with the cardholder is active on user device 120.

For example, in the example embodiment, locked data file 160 is protected by one or more encryption keys stored on user device 120. The encryption keys may be installed, for example, as part of a device enrollment process. The encryption keys are bound to the cardholder's user profile such that an operating system of user device 120 can only access the encryption keys needed to run locked data file 160 when the cardholder's user profile is active. If the cardholder's user profile is not active, the operating system cannot access the necessary encryption keys, and cannot run locked data file 160. In other embodiments, access to locked data file 160 is limited using other techniques (e.g., using file system access rights).

The challenge may be any message that locked data file 160 is able to generate a challenge response to. For example, in one embodiment, the challenge instructs locked data file 160 to perform a mathematical operation, and the challenge response includes the result of the mathematical operation. In another embodiment, the challenge requests a device ID (e.g., a MAC address, an IMEI number, etc.) for user device 120, and the challenge response includes the requested device ID.

In yet another embodiment, the challenge requests locked data file 160 confirm a current activated lifetime of locked data file 160, and the challenge response includes the current activated lifetime. The current activated lifetime is defined as the time difference between the current time (i.e., the time the challenge is received) and the time the locked data file 160 was installed on user device 120. The current activated lifetime is known only to locked data file 160 and device authentication server 170.

Upon receipt of the appropriate challenge response, device authentication server 170 authenticates user device 120, and consequently, the cardholder. Notably, in the example embodiment, the authentication of user device 120 does not require any action by the cardholder. That is, locked data file 160 on user device 120 automatically receives the challenge, generates the challenge response, and transmits the challenge response to the device authentication server.

After performing a successful authentication on the cardholder, the transaction may be authorized by issuer device 150, payment processor 140, and merchant device 130. Here, the transaction may processed and enter a transaction lifecycle including authorization, clearing, and settlement processes. However, if the authentication is unsuccessful (e.g., if no challenge response is received), the transaction may be declined by one of issuer device 150, payment processor 140, and merchant device 130. In other words, the authorization of the transaction may be declined. Accordingly, the transaction may not enter the transaction lifecycle and may be ended.

It should be appreciated that although the challenge is issued by device authentication server 170 in communication with payment processor 140, another device, for example, merchant device 130, issuer device 150, a third-party device, and the like, may instead issue the challenge and receive the challenge response. Accordingly, the examples herein are not limited to device authentication server 170 issuing the challenge. For example, cardholder may register for authentication with merchant device 130, a bank that issued a credit card for the merchant, and the like.

Figure 3:
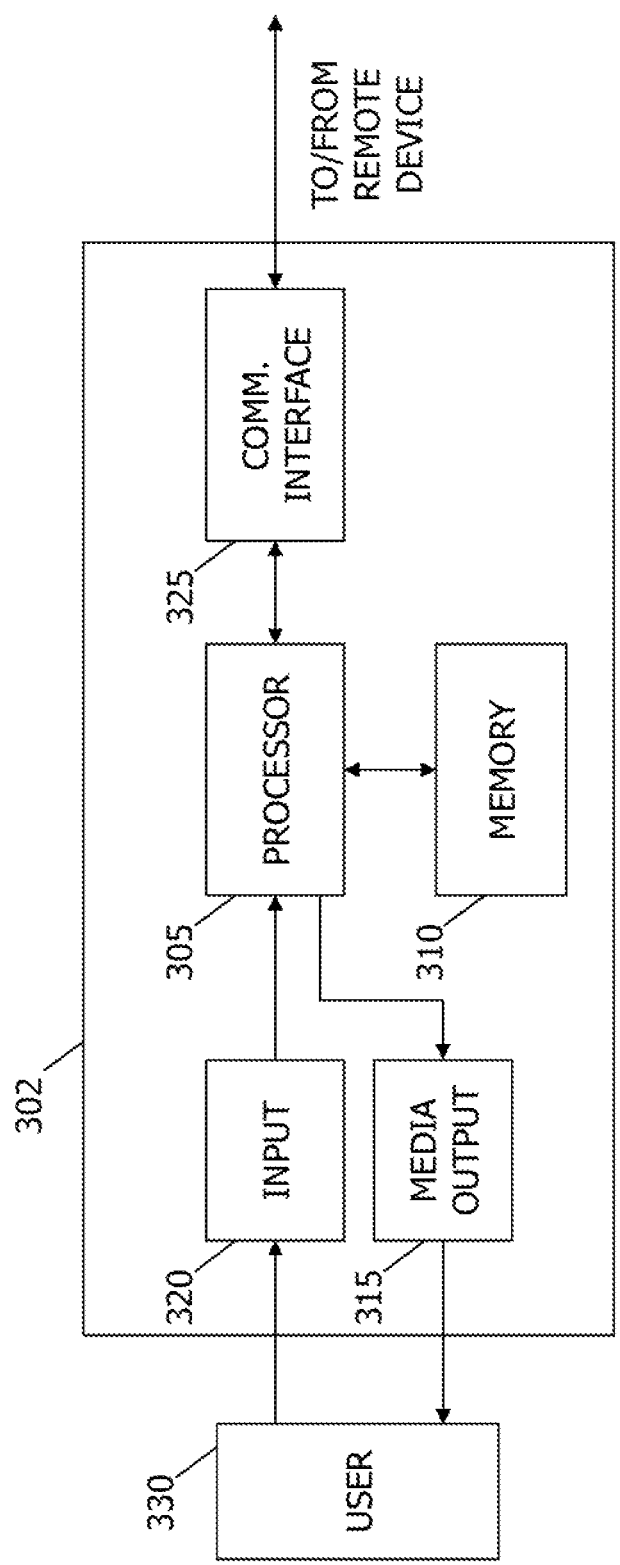

FIG. 3 depicts an example configuration of a computing device 302, such as user device 120 and device authentication server 170. Computing device 302 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or other data to be stored and retrieved. Memory area 310 may include one or more computer-readable media. An authenticator application, such as locked data file 160 (shown in FIG. 2) may be stored in memory area 310.

Computing device 302 may also include at least one media output component 315 for presenting information to a user 330. Media output component 315 may be any component capable of conveying information to user 330. In some embodiments, media output component 315 may include an output adapter, such as a video adapter and/or an audio adapter. An output adapter may be operatively coupled to processor 305 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 315 may be configured to present an interactive user interface (e.g., a web browser or client application) to user 330.

In some embodiments, computing device 302 may include an input device 320 for receiving input from user 330. Input device 320 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 315 and input device 320.

Computing device 302 may also include a communication interface 325, which may be communicatively coupleable to a remote device. Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, computer-readable instructions for providing a user interface to user 330 via media output component 315 and, optionally, receiving and processing input from input device 320. A user interface may include, among other possibilities, a web browser and client application. Web browsers enable users 330 to display and interact with media and other information typically embedded on a web page or a website from a web server associated with a merchant. A client application allows users 330 to interact with a server application associated with, for example, a vendor or business.

Figure 4:
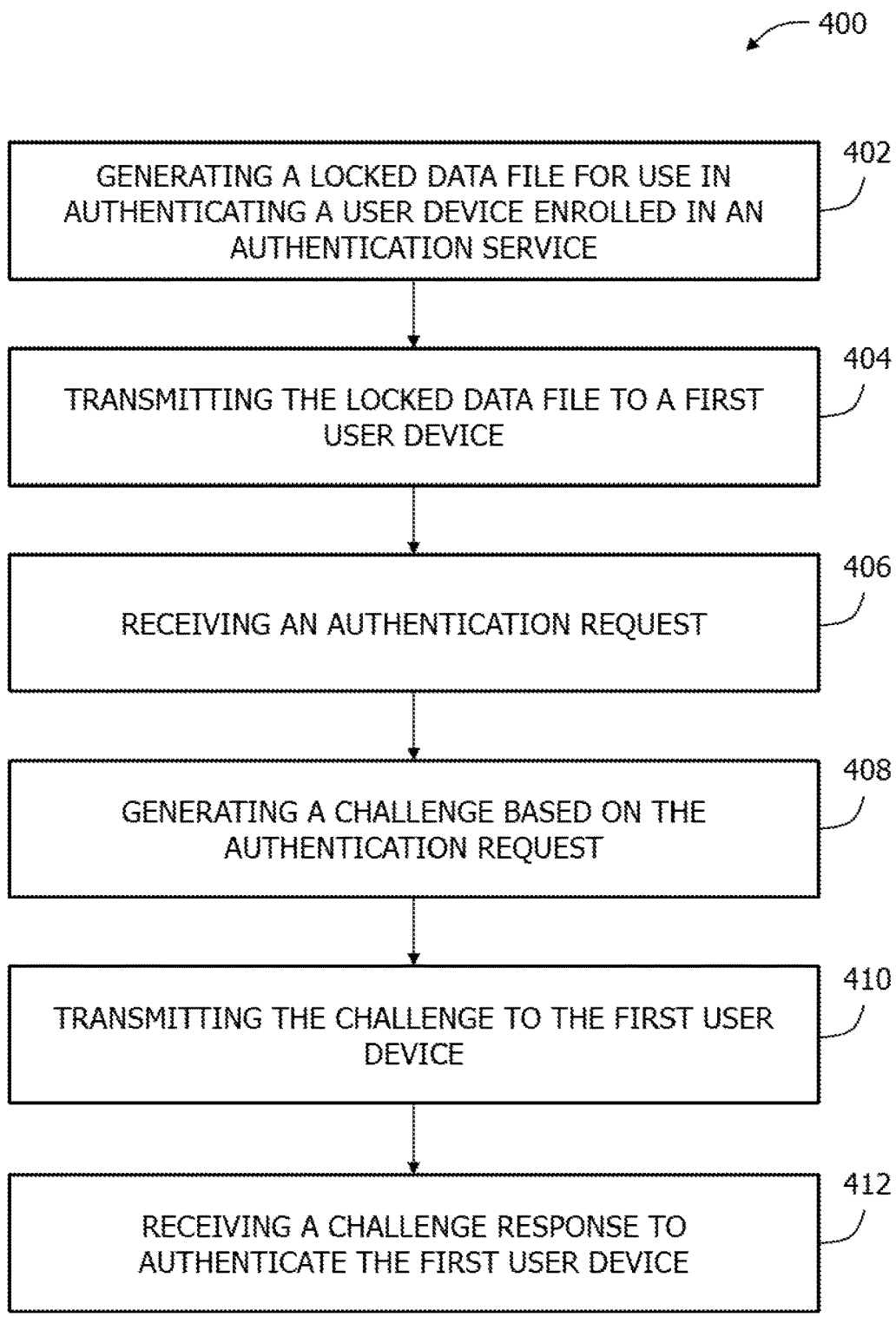

FIG. 4 is a flowchart of an example method 400 for authenticating a user device, performed by an authentication computing device, such as device authentication server 170 (shown FIG. 2), in accordance with one example embodiment of the present disclosure. More specifically, the authentication computing device is configured to generate 402 a locked data file for use in authenticating a user device enrolled in an authentication service. The locked data file is configured to process a challenge and generate a challenge response. The authentication computing device is further configured to transmit 404 the locked data file to a first user device as part of the first user device enrolling in the authentication service. Additionally, the authentication computing device is configured to receive 406 an authentication request.

Further, the authentication computing device is configured to generate 408 the challenge based on the authentication request, and transmit 410 the challenge to the first user device. After the first user device processes the challenge (i.e., using the locked data file), the authentication computing device is configured to receive 412 the challenge response to authenticate the first user device.

Figure 5:
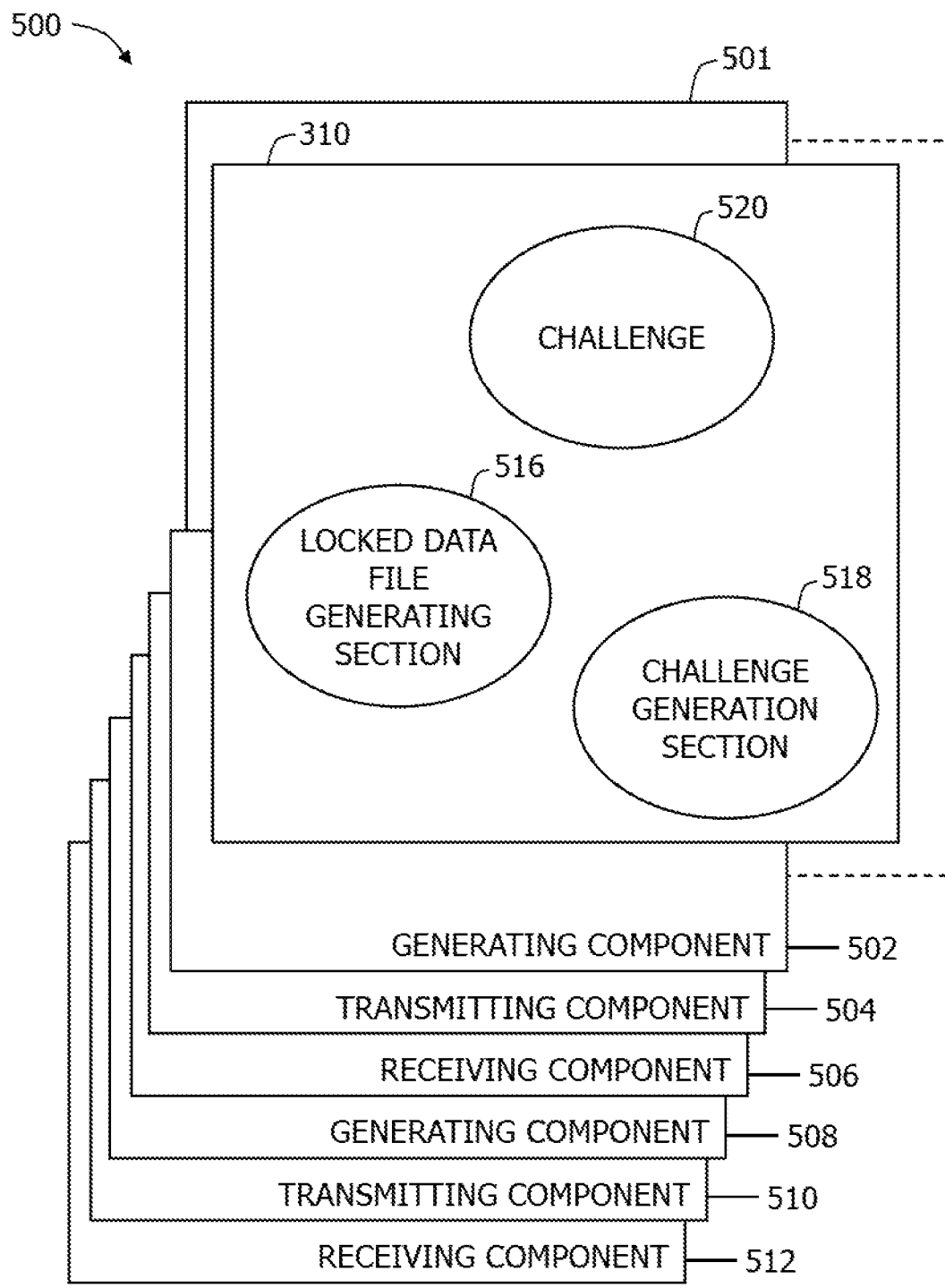

FIG. 5 is a diagram 500 of components of one or more example computing devices that may be used in method 400 shown in FIG. 4. FIG. 5 further shows a configuration of databases including at least memory area 310 (shown in FIG. 3). Memory area 310 is coupled to several separate components within an authentication computing device 501, which perform specific tasks.

Authentication computing device 501 includes a first generating component 502 for generating a locked data file for use in authenticating a user device enrolled in an authentication service. The locked data file is configured to process a challenge and generate a challenge response. Authentication computing device 501 further includes a first transmitting component 504 for transmitting the locked data file to a first user device. Additionally, authentication computing device 501 includes a first receiving component 506 to receive an authentication request.

Further, authentication computing device 501 includes a second generating component 508 to generate the challenge based on the authentication request. Authentication computing device 501 also includes a second transmitting component 510 to transmit the challenge to the first user device. In addition, authentication computing device 501 includes a second receiving component 512 to receive the challenge response to authenticate the first user device.

In an example embodiment, memory area 310 is divided into a plurality of sections, including but not limited to, locked data file generation section 516 and a challenge generation section 518. Memory area 310 also includes the generated challenge 520. These sections within memory area 310 are interconnected to update and retrieve the information as required.

Figure 6:
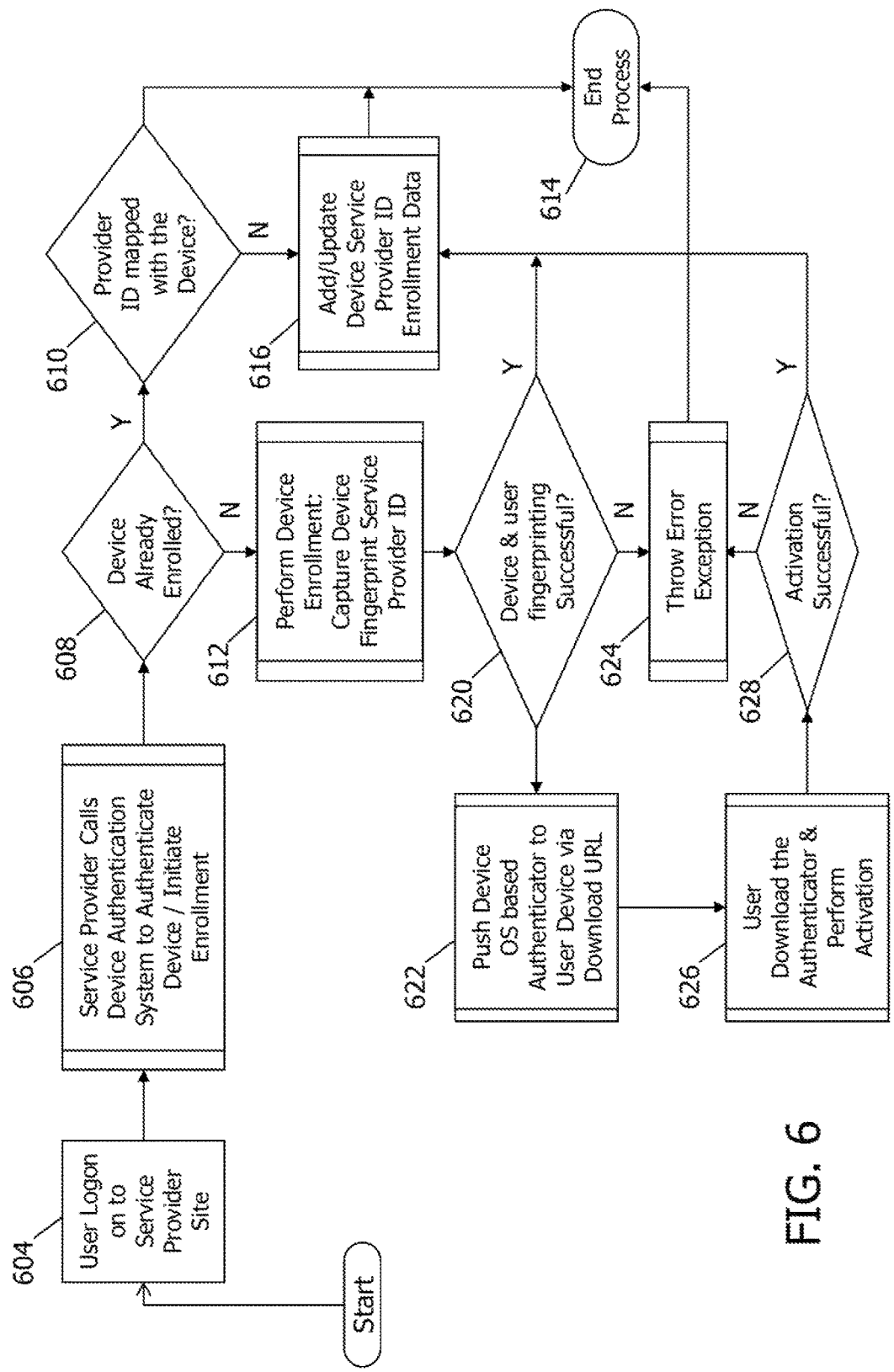

FIG. 6 is a flowchart of an example authentication enrollment process 600. As described above, as part of enrollment process 600, an authenticator application (e.g., locked data file 160) is pushed to user device 120. Enrollment process begins at block 602. At block 604, the user (i.e., the cardholder) logs onto a website operated by a party providing the authentication service (i.e., the service provider). The service provider may be the issuer bank, the merchant, or another party.

At block 606, the service provider contacts a device authentication system (e.g., device authentication server 170) to initiate enrollment for user device 120. At block 608, if user device 120 is already enrolled, flow proceeds to block 610. If, however, user device 120 is not enrolled, flow proceeds to block 612. From block 610, flow proceeds to block 614 if a service provider ID is already mapped to user device 120, and enrollment process 600 ends. If, however, a service provider ID is not mapped to user device 120, flow proceeds to block 616, where the device enrollment data and the service provider ID are added/updated before enrollment process 600 ends at block 614.

At block 612, device enrollment is performed, including capturing device data (e.g., a device ID of user device 120), biometric information for the cardholder (e.g., a fingerprint), and a service provider ID. At block 620, if the device data and biometric information are successfully captured, flow proceeds to both block 616 and to block 622. If the device data and biometric information are not successfully captured, flow proceeds to block 624, where an error message is generated and flow proceeds to block 614.

At block 622, the authenticator application (e.g., log file 160) is pushed to user device 120 (e.g., using a download URL). In the example embodiment, the authenticator application is operating system specific, such that user devices with different operating systems will receive the authenticator application in different formats. At block 626, user device 120 downloads the authenticator application and attempts to activate the authenticator application. At block 628, if the activation is successful, flow proceeds to block 616. If the activation is unsuccessful, flow proceeds to block 624.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for authenticating a user device by an authentication computing device, the method comprising:
   generating, using the authentication computing device, a locked data file for use in authenticating a user device enrolled in an authentication service, the locked data file configured to process a challenge and generate a challenge response;
   transmitting the locked data file from the authentication computing device to a first user device as part of the first user device enrolling in the authentication service, causing the locked data file to be installed on the first user device;
   receiving, at the authentication computing device, an authentication request for a transaction initiated using the first user device;
   generating, using the authentication computing device, the challenge based on the authentication request;
   transmitting the challenge directly from the authentication computing device to the first user device, wherein the challenge requests a current activated lifetime of the locked data file, and wherein the current activated lifetime is a time difference between a first time when the first user device receives the locked data file and a second time when the first user device receives the challenge; and
   receiving, at the authentication computing device, the challenge response directly from the first user device to authenticate the first user device, wherein the challenge response includes the current activated lifetime.

2. The method of claim 1, wherein the locked data file is further configured to decrypt the challenge using an encryption key.

3. The method of claim 1, wherein the locked data file is further configured to encrypt the challenge response using an encryption key.

4. The method of claim 1, further comprising receiving, at the authentication computing device, as part of the first user device enrolling in the authentication service, device information for the first user device.

5. An authentication computing device for authenticating a user device, said authentication computing device comprising one or more processors in communication with one or more memory devices, said authentication computing device configured to:
   generate a locked data file for use in authenticating a user device enrolled in an authentication service, the locked data file configured to process a challenge and generate a challenge response;
   transmit the locked data file to a first user device as part of the first user device enrolling in the authentication service, causing the locked data file to be installed on the first user device;
   receive an authentication request for a transaction initiated using the first user device;
   generate the challenge based on the authentication request;
   transmit the challenge directly from said authentication computing device to the first user device, wherein the challenge requests a current activated lifetime of the locked data file, and wherein the current activated lifetime is a time difference between a first time when the first user device receives the locked data file and a second time when the first user device receives the challenge; and
   receive the challenge response directly from the first user device to authenticate the first user device, wherein the challenge response includes the current activated lifetime.

6. The authentication computing device of claim 5, wherein the locked data file is further configured to decrypt the challenge using an encryption key.

7. The authentication computing device of claim 5, wherein the locked data file is further configured to encrypt the challenge response using an encryption key.

8. The authentication computing device of claim 5, wherein said authentication computing device is further configured to receive, as part of the first user device enrolling in the authentication service, device information for the first user device.

9. A non-transitory computer-readable storage medium having computer-executable instructions embodied thereon, wherein when executed by an authentication computing device having one or more processors in communication with one or more memory devices, the computer-executable instructions cause the authentication computing device to:
  generate a locked data file for use in authenticating a user device enrolled in an authentication service, wherein the locked data file is configured to process a challenge and generate a challenge response;
  transmit the locked data file to a first user device as part of the first user device enrolling in the authentication service, causing the locked data file to be installed on the first user device;
  receive an authentication request for a transaction initiated using the first user device;
  generate the challenge based on the authentication request;
  transmit the challenge directly from the authentication computing device to the first user device, wherein the challenge requests a current activated lifetime of the locked data file, and wherein the current activated lifetime is a time difference between a first time when the first user device receives the locked data file and a second time when the first user device receives the challenge; and
  receive the challenge response directly from the first user device to authenticate the first user device, wherein the challenge response includes the current activated lifetime.

10. The computer-readable storage medium of claim 9, wherein to transmit a locked data file, the computer-executable instructions cause the authentication computing device to transmit a locked data file configured to decrypt the challenge using an encryption key.

11. The computer-readable storage medium of claim 9, wherein to transmit a locked data file, the computer-executable instructions cause the authentication computing device to transmit a locked data file configured to encrypt the challenge response using an encryption key.

* * * * *